United States Patent
Charlton et al.

(10) Patent No.: US 8,021,585 B2
(45) Date of Patent: Sep. 20, 2011

(54) LIQUID COMPOSITIONS OF POLYMER ADDITIVES AND METHOD FOR THEIR PREPARATION

(75) Inventors: Zach Charlton, Houston, TX (US); Larry Spino, Houston, TX (US); George Kalantzakis, Missouri City, TX (US); John Lefas, Houston, TX (US); Salvatore D'Uva, Brantford (CA)

(73) Assignee: Ingenia Polymers Corp. (CA)

( * ) Notice: Subject to any disclaimer, the term of this patent is extended or adjusted under 35 U.S.C. 154(b) by 263 days.

(21) Appl. No.: 11/788,744

(22) Filed: Apr. 20, 2007

(65) Prior Publication Data

US 2008/0029741 A1    Feb. 7, 2008

Related U.S. Application Data

(60) Provisional application No. 60/793,647, filed on Apr. 21, 2006.

(51) Int. Cl.
| | |
|---|---|
| *C09K 15/18* | (2006.01) |
| *C09K 15/02* | (2006.01) |
| *C09K 15/30* | (2006.01) |
| *C09K 15/32* | (2006.01) |
| *C09K 15/08* | (2006.01) |
| *B29B 9/06* | (2006.01) |

(52) U.S. Cl. .................. 264/141; 264/143; 252/400.24; 252/399; 252/400.3; 252/400.5; 252/401; 252/404; 252/405

(58) Field of Classification Search .................. 264/143, 264/141; 252/400.24, 399, 400.3, 400.5, 252/400.61, 401, 404, 405

See application file for complete search history.

(56) References Cited

U.S. PATENT DOCUMENTS

| | | | |
|---|---|---|---|
| 5,164,132 A * | 11/1992 | Robeson et al. | 264/28 |
| 5,240,642 A | 8/1993 | Neri et al. | |
| 5,597,857 A * | 1/1997 | Thibaut et al. | 524/400 |
| 5,844,042 A | 12/1998 | Neri et al. | |
| 6,107,383 A | 8/2000 | Sharma | |
| 6,423,800 B1 | 7/2002 | Musgrave | |
| 6,515,052 B2 | 2/2003 | Semen | |
| 6,740,694 B2 | 5/2004 | Thibaut et al. | |
| 6,800,228 B1 | 10/2004 | Semen | |
| 6,864,304 B2 | 3/2005 | Staniek | |
| 6,875,808 B2 | 4/2005 | Weier et al. | |

* cited by examiner

*Primary Examiner* — Jennifer K. Michener
*Assistant Examiner* — Magali P Slawski
(74) *Attorney, Agent, or Firm* — The Webb Law Firm

(57) ABSTRACT

A method is described for preparing liquid concentrates of additives for incorporation in polymers, particularly polymers prepared in solution or slurry phase polymerization media. Additive concentrates according to the invention are characterized by a finer dispersion than would result from the direct addition of particulate or granular additives to the same liquid solvent.

9 Claims, No Drawings

LIQUID COMPOSITIONS OF POLYMER ADDITIVES AND METHOD FOR THEIR PREPARATION

CROSS REFERENCE TO RELATED APPLICATIONS

This application claims the benefit of U.S. Provisional Application No. 60/793,647 filed Apr. 21, 2006 entitled Liquid Polymer Additive Compositions and Method for Their Preparation.

FIELD OF THE INVENTION

The invention relates to novel methods of introducing additives into polymers, particularly polymers made by solution or suspension polymerization in which, following polymerization, the polymer particles are suspended in a fluid. Liquid concentrates of polymer additives according to the invention are added to the polymer suspension phase and, upon separation of the polymer from the carrying fluid, the selected additives contained in the concentrate remain dispersed in the polymer mass. Additives are selected for their properties in improving and maintaining the physical properties of the bulk polymer.

BACKGROUND AND PRIOR ART

Polymer additives and additive blends are used to protect polymers from thermo-oxidative degradation, to provide long term resistance to light or heat, neutralize residual catalyst and to enhance performance properties of the finished product. Polymer additives typically come in powder, granule or pellet form. These additives can be added to the polymer during post reactor extrusion operations, or, in the case of solution and slurry polymerizations, can be added to a liquid carrier and mixed with the polymer suspension post reactor.

Polymer additives in powder form can be difficult to handle and feed and in the case of some additives pose a potential health, fire and explosion risk. If the polymer system requires the addition of several components, the additives must be either pre-blended, or the use of more than one feeder is required.

Preparation of non-dusting pellet forms of additive blends solves many of these problems. U.S. Pat. No. 5,240,642 entitled "Process for Obtaining Granular Forms of Additives for Organic Polymers" describes a process for making low-dust granules of an additive blend including a phenol antioxidant and an acid neutralizer processed in the amorphous or molten state including using an extruder. U.S. Pat. No. 5,844,042 entitled "Process for Obtaining Granular Forms of Additives for Organic Polymers" describes granular forms of additive blends prepared by forcing the blend through a die to form strands and then cutting said strands to form pellets. U.S. Pat. No. 5,597,857, entitled "Low-dust Granules of Plastic Additives" describes additive pellets comprising 10-100% calcium stearates. U.S. Pat. No. 6,740,694B2 entitled "Preparation of low-dust stabilizers" describes using a sub-cooled melt of an additive as a carrier liquid for other additives and as well as amorphous versions of stabilizers. U.S. Pat. No. 6,515,052 entitled "Granular Polymer Additives and their Preparation" describes using a solvent in a compaction process to improve the yield and quality of a compacted additive blend including a phosphite. U.S. Pat. No. 6,800,228 entitled "Sterically hindered phenol antioxidant granules having Balance Hardness" by the same inventor describes using a solvent for the preparation of compacted additive blends which include a phenol.

The patents identified above describe low-dusting forms of additive blends that can be more conveniently and accurately fed to post-reactor extrusion operations for addition to a polymer. In solution, suspension or slurry phase polymerization processes, however, additives and additive blends are frequently added to a liquid before being introduced to the post-reactor polymer-liquid slurry. If the additive or additive blend does not completely dissolve in the liquid carrier a slurry may be formed. The uniformity of the slurry may vary depending on the particle sizes of the undissolved additives. Conventional additives and additive blends will form a slurry containing many large size particles. These particles can settle out of the slurry, collect in dead zones of the process and transport equipment, foul filters and cause defects in the finished product

SUMMARY OF THE INVENTION

It is a principal object of the present invention to provide liquid concentrates containing polymer additives in the form a very fine dispersion. As a result, additive blends according to the invention dissolve substantially completely in solution or slurry phase polymerization media, avoiding the aforementioned problems with conventional additives and additive blends.

Two different approaches have been taken to preparing liquid additive concentrates according to the invention:

(i) The polymer additive blend is fed through an extruder and forced through a die to produce pellets. During extrusion at least one of the additives is melted or softened. The remaining un-melted particles are subjected to shear and/or heat and are finely dispersed in the softened or melted additive. The pellets so formed are dispersed in the same liquid solvent used in solution or slurry polymerization to form a liquid additive concentrate.

(ii) The polymer additive blend is fed through a compaction mill and forced through a die to produce pellets. Although the production of pellets is carried out by agglomeration of particles, during compaction the polymer additives are subjected to shear and pressure forces which cause attrition of the individual particles. The pellets so formed are dispersed in the same liquid solvent used in solution or slurry polymerization to produce liquid additive concentrate.

Whether the production of the liquid additive concentrate is achieved by approach (i) or (ii)) above, the additive concentrate formed is characterized by a finer dispersion than would result from direct addition of the individual or dry-blended powder or granular additives to the same liquid solvent.

DETAILED DESCRIPTION AND EXAMPLES

The liquid additive concentrates useful in the invention are prepared by mixing and shearing powder or granular additives to a fine dispersion and composing them into a liquid concentrate for feeding to a solution or slurry phase polymerization process. The liquid polymer concentrates of the present invention include a phosphite and/or a phenol and/or one or more other polymer additives.

Phosphites that can be used in the present invention include, but are not limited to, tris-(2,4-di-t-butylphenyl) phosphite, tetrakis(2,4-di-tert-butylphenyl)[1,1-biphenyl]-4, 4'-diylbisphosphonite, bis(2,4-di-t-butylphenyl)pentaerythritol diphosphite, bis(2,4-di-t-cumylphenyl)pentaerythritol diphosphite, tetrakis(2,4-di-t-butylphenyl) 4,4'-biphenylene diphosphonite, 2,4,6 tri-t-butylphenyl 2 butyl 2 ethyl 1,3 propane diol phosphite, distearyl pentaerythritol diphosphite, tris(nonylphenyl)phosphite and trilauryl trithio phosphite.

Phenols of the present invention include, but are not limited to, penterythritol tetrakis (3-(3,5-di-t-butyl-4-hydroxyphenol)propionate), octadecyl 3,5-Di-(tert)-butyl-4-hydroxyhydrocin namate, 1,3,5-tris(3,5-di-tert-butyl-4-hydroxybenzyl)-1,3,5-triazine-2,4,6(1h,3h,5h)-trione, 1,3,5-trimethyl-2,4,6-tis(3,5-di-tert-butyl-4-hydroxybenzoyl)benzene, 2,6-di-t-butyl-p-cresol, 1,2-bis(3,5-di-tert-butyl-4-hydroxyhydrocinnamyl)hydrazine, 1,3,5-tris(4-tert-butyl-3-hydroxy-2,6-dimethyl benzyl)-1,3,5-triazine-2,4,6-(1h,3h,5h)-trione, 2,2'-ethelidenebis (4,6-di-tert-butylphenol), and 3,5-bis(1,1-dimethylethyl)-4-hydroxy-thiodi-2,1-ethanediylester.

Polymer additives are of the group including metal stearates, hindered amines, zinc oxide, hydrotalcite, sodium benzoate, nucleators and clarifiers, benzophenones, benzotriazoles, talc, calcium carbonate, aluminosilicates, amides, amines and similar chemicals known in the art.

Phosphites, phenols and polymer additives are typically available in powder or granular form. In powder form polymer additives used in the present invention may have a limited solubility in the liquid carrier used in solution or slurry phase polymerizations.

Optionally a dispersion/suspension aid may be added to the polymer additive blend to facilitate the suspension of particles in the liquid carrier. This may include surfactants which could improve the uniformity of undissolved additives in suspension.

Liquid carriers used in the present invention are aliphatic or aromatic hydrocarbons or mixtures thereof.

Addition of the polymer additives to the liquid solvent will lead to partial or complete dissolution of the additive. Where the additive is not completely dissolved, a slurry will be formed. Polymer additives, including phosphites and phenols, typically have a particle size distribution including a large number of particles greater than 150 microns and may include particles up to 700 microns. Particles this size will settle out more quickly than smaller particles when mixed with the liquid carrier. Particles of this size can collect in dead zones in process and transport equipment and when mixed with the polymer, will represent defects.

The process of the present invention involves mixing and shearing a polymer additive blend to give particles of a fine dispersion. Said mixture can then be formed into a pellet characterized by easy dispersion into a liquid carrier or prepared directly as a finely dispersed concentrate in said liquid carrier. Pellet forming operations include, but are not limited to, pellet mills, single screw extruders, and twin-screw extruders. Liquid dispersions may be prepared directly using wet milling techniques.

In one embodiment of the invention a polymer additive blend consisting of a phosphite and/or a phenol and optionally one or more other polymer additives are fed to an extruder and forced through a die to produce pellets. Said pellets are then mixed with a liquid solvent to form a liquid additive concentrate.

The first step in this process is feeding the polymer additives to said extruder. The individual polymer additives may be pre-blended and fed as a blend to the extruder or they may be metered independently. Pre-blending may be accomplished by weighing components and blending them together. Blending may be accomplished by any means known in the art, including, but not limited to hand mixing, tumble blending, ribbon blending, low-intensity and high-intensity mixing. Metering additives independently can be accomplished volumetrically or loss-in-weight by any means known in the art.

The polymer additives or additive blend can be flood fed or starve fed to an extruder. The extruder may be of any type, including, but not limited to, a single screw extruder, a twin screw extruder, a planetary extruder or any combination thereof. Said extruder performs the function of shearing and mixing the additive or additive blend and melting or softening at least one component of the additive blend. The remaining unmelted particles are subjected to shear and or heat and are finely dispersed in the softened or melted additive.

Downstream of the extruder the polymer additive blend is formed into pellets. This may be accomplished by any method known in the art. Typically the additive blend is forced through a die. The strand may be cut directly at the die face or the strand can be pulled and cooled and then cut into pellets. Alternatively the additive blend can be transferred from the extruder die to a rotoformer to be formed into pellets. This is especially beneficial in cases where the additive blend forms a low viscosity mixture.

The pellets are then blended with a hydrocarbon liquid carrier used in the solution or slurry phase polymerization process to form a concentrate. The pellets may be blended with the liquid by any means known in the art. The liquid concentrate formed is characterized by high dispersability in a polymer slurry and a fine particle dispersion. The liquid concentrate will show less than 5% retain when filtered through a 100 mesh screen, preferably less than 1% retain on a 100 mesh screen and more preferably less than 0.5% retain on a 100 mesh screen.

In a second embodiment of the invention a polymer additive blend consisting of a phosphite and/or a phenol and optionally one or more other polymer additives are fed to a compaction mill and forced through a die to produce pellets. During compaction the polymer additives are subjected to shear and pressure forces which cause attrition of the particles even as they are compacted into a pellet. Said pellets are then mixed with a liquid solvent to form a liquid additive concentrate.

The first step in this process is feeding the polymer additives to said pellet mill. The individual polymer additives may be pre-blended and fed as a blend to the pellet mill or they may be metered independently. Pre-blending may be accomplished by weighing components and blending them together. Blending may be accomplished by any means known in the art, including, but not limited to hand mixing, tumble blending, ribbon blending, and high-intensity mixing. Metering additives independently can be accomplished volumetrically or loss-in-weight by any means known in the art.

The polymer additives or additive blend are then fed to a pellet mill. The pellet mill may be of any type known to those in the art. Manufacturers of such types of mills include California Pellet Mill (Crawfordsville, Ind.), Bliss Industries (Ponca City, Okla.) and Kahl (Germany). Said pellet mill forms a pellet by forcing the additive blend through a rotating cylindrical die using a roller. Shear between the roller and die and between the material and die and die holes can cause attrition of the granular or powder additives as they are being compacted into a pellet. The pellets formed are considerably larger than the particles of the granular or powder additives. However, when blended with a liquid they give a finer dispersion than would the powder additives.

The pellets are blended with a liquid used in the solution or slurry phase polymerization process to form a concentrate. The pellets may be blended with the liquid by any means known in the art. The liquid concentrate formed is characterized by a high dispersability in a polymer slurry and a fine particle dispersion. The liquid concentrate will show less than 5% retain when filtered through a 100 mesh screen, preferably less than 1% retain on a 100 mesh screen and more preferably less than 0.5% retain on a 100 mesh screen.

Example 1

A sieve analysis was done on Irganox 1076, Irganox 1010 and Irgafos 168 (Ciba Specialty Chemicals) according to ASTM D1921-89. The percent retain on each sieve is recorded in Table 1. The data shows that the powder additives include a significant number of particles greater than 149 microns.

TABLE 1

Sieve Analysis of Liquid Additive Concentrates Prepared from Raw Powder Additives

| Sieve | | Percent Retain on Sieve | | |
| --- | --- | --- | --- | --- |
| Sieve Size (Mesh) | Opening (microns) | Irganox 1010 | Irgafos 168 | Irganox 1076 |
| 20 | 840 | 1.6 | 0.1 | 1.3 |
| 30 | 590 | 8.4 | 0.3 | 0.7 |
| 35 | 500 | 7.7 | 0.7 | 0.5 |
| 50 | 297 | 43.4 | 22.5 | 1 |
| 100 | 149 | 28.3 | 33.9 | 14.8 |
| 120 | 125 | 2.4 | 12 | 33.3 |
| 200 | 74 | 6.5 | 24.7 | 46 |
| Pan | | 1.7 | 5.5 | 2.4 |

Next, four liquid additive concentrates were prepared from the raw powder additives in Isopar E (ExxonMobil Chemical) in the ratios in Table 2. The materials were mixed in a 600 mL beaker at 20-degrees Celsius for 60 minutes using a magnetic stirring bar turning at 300 revolutions per minute. After 60 minutes the mixture was removed and poured through a 100 mesh sieve, rinsed with cold (0° C.) Isopar E and dried. The additive retained on the screen was weighed and the percentage of the additive retained was calculated. The results are found in Table 2. The results show that 0 grams of the Irganox 1076, 3.0 grams of the Irganox 1010, 10 grams of the Irgafos 168 and 14.5 grams of the blend were retained on the 100 mesh screen. The Irganox 1076 dissolved completely. The results show that a significant amount of Irganox 1010 and Irgafos 168 particles greater than 149 microns were present in the liquid concentrate. These particles would cause significant processing difficulties in a commercial solution or slurry polymerization process including settling out during, collecting in dead zones of the process and causing defects in the finished product.

TABLE 2

Recipe and 100 mesh retain for additive concentrates

| | Recipe 1 | Recipe 2 | Recipe 3 | Recipe 4 |
| --- | --- | --- | --- | --- |
| Parts Irganox 1076 | 9.5 | | | 9.5 |
| Parts Irganox 1010 | | 7.6 | | 7.6 |
| Parts Irgafos 168 | | | 37.9 | 37.9 |
| Parts Isopar E | 490.5 | 492.4 | 462.1 | 445 |
| Grams retained on 100 mesh screen | 0 | 3.0 | 10.0 | 14.5 |
| Percent retained on 100 mesh screen | 0 | 39.5 | 26.4 | 26.4 |

Example 2

A polymer additive blend consisting of 17.2% Irganox 1076, 13.8% Irganox 1010 and 69.0% Irgafos 168 was prepared on a lab scale California Pellet Mill. A die with ⅛" diameter holes and a plate thickness of ⅜" was used. The pellets formed had dimensions of ⅛" diameter×5/16" length. 55 parts of the pellets were mixed with 445 parts of Isopar E to create a liquid additive concentrate. Mixing was carried out under the same conditions as in Example 1. 55 grams of pellets corresponds to 9.5 grams of Irganox 1076, 7.6 grams of Irganox 1010 and 37.9 grams of Irgafos 168. The retain of this mixture on a 100 mesh screen was 2.5 grams—equivalent to 4.5% of the polymer additive in the concentrate. This represents a significant improvement over the 14.5 grams retained in Example 1, recipe 4.

Example 3

A polymer additive blend consisting of 17.2% Irganox 1076, 13.8% Irganox 1010 and 69.0% Irgafos 168 was prepared on 25 mm ZSK co-rotating twin screw extruder (Coperion Corporation). The extruder was run with barrel temperatures set at 55-degrees Celsius at a screw speed of 200 RPM using a high-shear screw configuration. The temperature of the mixture at the exit of the extruder was 70-degrees Celsius. These processing conditions result in the melting of the Irganox 1076 and cause significant shearing and attrition of the Irgafos 168 and Irganox 1010 particles. The pellets formed had dimensions of ⅛" diameter×½" length. 55 parts of the pellets were mixed with 445 parts of Isopar E to create a liquid additive concentrate. Mixing was carried out under the same conditions as in Example 1. 55 grams of pellets corresponds to 9.5 grams of Irganox 1076, 7.6 grams of Irganox 1010 and 37.9 grams of Irgafos 168. The retain of this mixture on a 100 mesh screen was 0.8 grams—equivalent to 1.5% of the polymer additive in the concentrate. This represents a significant improvement over the 14.5 grams retained in Example 1, recipe 4.

The invention claimed is:

1. A method for preparing a liquid concentrate of polymer additives to add to a solvent or slurry process to minimize undesired residual solids level, consisting of the steps of:
   (i) providing a dry blend of polymer additives and densifying the blend by the application of thermomechanical energy;
   (ii) forcing the blend through a die to produce pellets, wherein the pellets are at least ⅛ inch in diameter and at least 5/16 inch in length; and
   (iii) dispersing the pellets in a liquid solvent to produce said liquid additive concentrate showing ≦5.0% retention through a 100 mesh screen,
   wherein said polymer additives consist of, (i) at least one of an organic phosphite, and a phenol, and (ii) at least one of zinc oxide, hydrotalcite, a benzophenone, a benzotriazole, talc, calcium carbonate, aluminosilicate, an amide, and an amine.

2. The method of claim 1, wherein the application of thermomechanical energy comprises feeding a dry blend of polymer additives through an extruder, so that at least one of the additives is melted or softened during extrusion.

3. A method of preparing a liquid concentrate according to claim 2, wherein said solvent is selected from aliphatic hydrocarbons, aromatic hydrocarbons or mixtures thereof.

4. A method according to claim 3, wherein said additives comprise an organic phosphite selected from the group consisting of tris-(2,4-di-t-butylphenyl)phosphite, his (2,4-di-t- butylphenyl)pentaerythritol diphosphite, his (2,4-di-t-cumylphenyl)pentaerythritol diphosphite, tetrakis(2,4-di-t-butylphenyl) 4,4'-biphenylene diphosphonite, 2,4,6 tri-t-butylphenyl 2 butyl 2 ethyl 1,3 propane diol phosphite, distearyl pentaerythritol diphosphite, tris(nonylphenyl)phosphite and trilauryl trithio phosphite.

5. A method according to claim 3, wherein said additives comprise a phenol selected from the group consisting of pentaerythritol tetrakis (3-(3,5-di-t-butyl-4-hydroxyphenol) propionate), octadecyl 3,5-Di-(tert)-butyl-4-hydroxyhydrocinnamate, 1,3,5-tris(3,5-di-tert-butyl-4-hydroxybenzyl)-1,3,5-triazine-2,4,6(1h,3h,-5h)-trione, 1,3,5-trimethyl-2,4,6-tis(3,5-di-tert-butyl-4-hydroxybenzoyl)benzene, 2,6-di-t-butyl-p-cresol, 1,2-bis(3,5-di-tert-butyl-4-hydroxyhydrocinnamyl)hydrazine, 1,3,5-tris(4-tert-butyl-3-hydroxy-2,6-dimethyl benzyl)-1,3,5-triazine-2,4,6-(1h,3h,5h)-trione, 2,2'-ethelidenebis(4,6-di-tert-butylphenol), and 3,5-bis(1,1-dimethylethyl)-4-hydroxy-thiodi-2,1-ethanediylester.

6. The method according to claim 3, wherein said additives comprise an organic phosphonite, wherein the organic phosphonite is tetrakis(2,4-di-tert-butylphenyl)[1,1-biphenyl]-4,4'-diylbisphosphonite.

7. The method of claim 1, wherein the amine is a hindered amine.

8. The method according to claim 1, wherein the pellets are at least ⅛ inch in diameter and at least ½ inch in length.

9. The method according to claim 1, wherein the liquid additive concentrate shows 1.5% retention through a 100 mesh screen.

* * * * *

UNITED STATES PATENT AND TRADEMARK OFFICE
CERTIFICATE OF CORRECTION

PATENT NO. : 8,021,585 B2  Page 1 of 1
APPLICATION NO. : 11/788744
DATED : September 20, 2011
INVENTOR(S) : Zach Charlton et al.

It is certified that error appears in the above-identified patent and that said Letters Patent is hereby corrected as shown below:

Column 6, Line 67, Claim 4, delete "his" and insert -- bis --

Column 7, Line 1, Claim 4, delete "his" and insert -- bis --

Column 7, Line 12, Claim 5, delete "-5h)" and insert -- 5h) --

Column 7, Line 13, Claim 5, delete "tis" and insert -- tris --

Column 8, Line 1, Claim 5, delete "ethelidenebis" and insert -- ethylidenebis --

Signed and Sealed this
Twenty-eighth Day of February, 2012

David J. Kappos
*Director of the United States Patent and Trademark Office*